(12) United States Patent
Baudelocque

(10) Patent No.: US 10,605,310 B2
(45) Date of Patent: Mar. 31, 2020

(54) LANDING BEARING ASSEMBLY AND ROTARY MACHINE EQUIPPED WITH SUCH AN ASSEMBLY

(71) Applicant: SKF Magnetic Mechatronics, Saint-Marcel (FR)

(72) Inventor: Luc Baudelocque, Vernon (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 255 days.

(21) Appl. No.: 15/824,181

(22) Filed: Nov. 28, 2017

(65) Prior Publication Data
US 2018/0149204 A1    May 31, 2018

(30) Foreign Application Priority Data
Nov. 28, 2016    (EP) .................................... 16306564

(51) Int. Cl.
| | |
|---|---|
| *H02K 7/09* | (2006.01) |
| *F16C 39/02* | (2006.01) |
| *F16C 32/04* | (2006.01) |
| *F16C 27/04* | (2006.01) |
| *H02K 7/08* | (2006.01) |

(52) U.S. Cl.
CPC .............. *F16C 39/02* (2013.01); *F16C 27/04* (2013.01); *F16C 32/0425* (2013.01); *F16C 32/0442* (2013.01); *H02K 7/09* (2013.01); *F16C 2380/26* (2013.01); *H02K 7/083* (2013.01)

(58) Field of Classification Search
CPC ........ H02K 7/09; F16C 39/02; F16C 32/0425

USPC .................................................. 310/90, 90.5
See application file for complete search history.

(56) References Cited

U.S. PATENT DOCUMENTS

| | | | |
|---|---|---|---|
| 6,707,187 B1* | 3/2004 | Gabrys ................. | H02K 7/025 310/74 |
| 2004/0189124 A1 | 9/2004 | Baudelocque et al. | |
| 2011/0084563 A1* | 4/2011 | Maier ................. | F16C 32/0442 310/90.5 |
| 2011/0285233 A1* | 11/2011 | Singhal .................. | F16C 35/00 310/90.5 |

(Continued)

FOREIGN PATENT DOCUMENTS

| | | |
|---|---|---|
| EP | 2821657 A1 | 1/2015 |
| JP | S6256824 U | 4/1987 |

(Continued)

*Primary Examiner* — Hanh N Nguyen
(74) *Attorney, Agent, or Firm* — Garcia-Zamor Intellectual Property Law, LLC; Ruy Garcia-Zamor; Bryan Peckjian

(57) ABSTRACT

A landing bearing assembly for a rotary machine rotatable around a central axis and having a stator, a rotor with a shaft, a magnetic bearing, an auxiliary rolling bearing with two lateral faces, a landing sleeve facing, in normal operation of the rotary machine when the rotor is supported only by the magnetic bearing, the auxiliary rolling bearing at a nominal distance defined as the landing airgap El, the auxiliary rolling bearing coming into contact with the landing sleeve upon landing of the rotor in the event of a high shock. The assembly further provides a compliance ring with a nominal thickness Eo made from a material with a lower mechanical stiffness than the material constituting the other components of the landing bearing assembly to first absorb some energy of the shock by elastic deformation resulting in a reduction of its thickness.

12 Claims, 3 Drawing Sheets

(56) References Cited

U.S. PATENT DOCUMENTS

2014/0072253 A1  3/2014  Ruhl et al.
2015/0003769 A1  1/2015  Delepine et al.

FOREIGN PATENT DOCUMENTS

JP   S63198451 A   8/1988
JP   H0272217 A    3/1990

\* cited by examiner

LANDING BEARING ASSEMBLY AND ROTARY MACHINE EQUIPPED WITH SUCH AN ASSEMBLY

CROSS-REFERENCE

This application claims priority to European patent application no. 16306564.2 filed on Nov. 28, 2016, the contents of which are fully incorporated herein by reference.

TECHNOLOGICAL FIELD

The invention concerns a landing bearing assembly to be used in a rotary machine comprising a rotor, a stator and a magnetic bearing. The invention also relates to a rotary machine comprising a landing bearing assembly.

BACKGROUND

Some conventional rotary machines are equipped with a stator, a rotor, and a magnetic bearing for supporting without contact the rotation of the rotor with respect to the stator. In order to avoid any direct contact between the stator and the rotor in case of failure, shutdown or overload of the magnetic bearing, which may lead, in the worst case, to the destruction of the machine when rotating at high speed, an auxiliary rolling bearing is arranged on the stator and a landing sleeve is arranged on the rotor. Upon landing of the rotor that is to say of the auxiliary rolling bearing onto the landing sleeve, the rolling bearing complements or substitutes for a short period of time the magnetic bearing in order to continue to support the rotation of the rotor with respect to the stator.

The rolling elements of the auxiliary rolling bearing are usually balls because they offer a higher possible rotational speed than rollers, but unfortunately also a lower load capacity for the auxiliary bearing.

JP-S63-198451-A discloses an auxiliary bearing in the form of a thrust ball bearing onto which is fixed an elastic buffering plate to absorb the shock created by the fall of a vertical rotor upon failure of the magnetic bearing supporting the rotor.

However, in some applications, the rotary machine may be subject to much higher shocks created in the environment of the rotary machine, such as a handling shock or a military shock, resulting in too high compression forces on the balls and possibly the partial or total destruction of the auxiliary bearing, if not of the rotary machine itself, when the above mentioned patent would not prevent contact and damage to unwanted part inside the machine.

Consequently, there is room for improvement.

SUMMARY OF THE INVENTION

The aim of the invention is to provide an improved landing bearing assembly to be used in a rotary machine comprising a stator, a rotor with a shaft and a magnetic bearing.

To this end, the invention concerns a landing bearing assembly comprising an auxiliary rolling bearing and a landing sleeve designed to come into contact with each another upon landing of the rotor.

According to the invention, the landing bearing assembly further comprises a compliance ring made from a material with a lower mechanical stiffness than the material constituting the other components of the landing bearing assembly so as to first absorb some energy of the shock by elastic deformation resulting in a reduction of its thickness.

The compliance ring is in contact with the auxiliary rolling bearing at least during the landing of the rotor.

The compliance ring has, before deformation, a nominal thickness $E_o$, and, if it were fully compressed elastically, its thickness would reach a fully compressed thickness $E_{fc}$.

According to the invention, the landing bearing assembly further comprises an emergency landing ring for absorbing the energy of the shock that cannot be absorbed by the compliance ring alone. The emergency landing ring is integrally formed with the stator and contacts the shaft of the rotor only when the compliance ring has been partly compressed elastically, that is to say before the compliance ring has been fully compressed elastically, in such a way that the auxiliary rolling bearing is never compressed between two stiff contacts during the landing.

Thanks to the invention, in the event of a heavy shock which typically lasts not more than one second, upon landing of the rotor, a part of the mechanical energy of the shock is first absorbed by the compliance ring which deforms elastically. Should there be a remaining amount of energy, it is then absorbed by the emergency landing ring when the latter contacts the shaft of the rotor, so that the compliance ring is not further compressed and keeps some elasticity so as to protect the auxiliary rolling bearing from too high compression forces.

Thanks to the invention, once the shock ends, the rotation of the shaft of the rotor can come to a full stop with the preserved auxiliary rolling bearing, or even continue to run without any damage on the mechanical parts.

According to further aspects of the invention which are advantageous but not compulsory, such a landing bearing assembly may incorporate one or several of the following features:

The nominal thickness of the compliance ring is comprised between 0.2 mm and 2 mm In normal operation of the rotary machine, the emergency landing ring stays at a predetermined distance from the rotor, defined as the emergency airgap $E_e$, and given by the formula: $E_o > E_e > E_l$.

The compliance ring seats with interference fit on a radially outer surface of the shaft.

The auxiliary rolling bearing seats with an interference fit on an outer surface of the compliance ring.

The landing sleeve is integrally formed with the stator and is made from a hardened material such as nitrated 40CAD6-12.

The auxiliary rolling bearing seats with an interference fit in the stator.

The landing sleeve seats onto an outer radial surface of the compliance ring and consists of a bushing made from a hardened material such as nitrated 40CAD6-12.

A damping ribbon, for preventing the whirling of the rotor shaft inside the auxiliary rolling bearing, is interposed between an outer surface of the auxiliary rolling bearing and the stator.

The auxiliary rolling bearing is integrally formed with the stator and the compliance ring is interposed between one of the two lateral faces of the auxiliary rolling bearing and a first radial portion of the stator.

A second compliance ring is interposed between the other one of the two lateral faces of the auxiliary rolling bearing and a second radial portion of the stator to act as an axial shock protection.

Another object of the invention is a rotary machine comprising a stator assembly, a rotor assembly, a magnetic bearing and a landing bearing assembly according to the invention.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION

Figure 1:
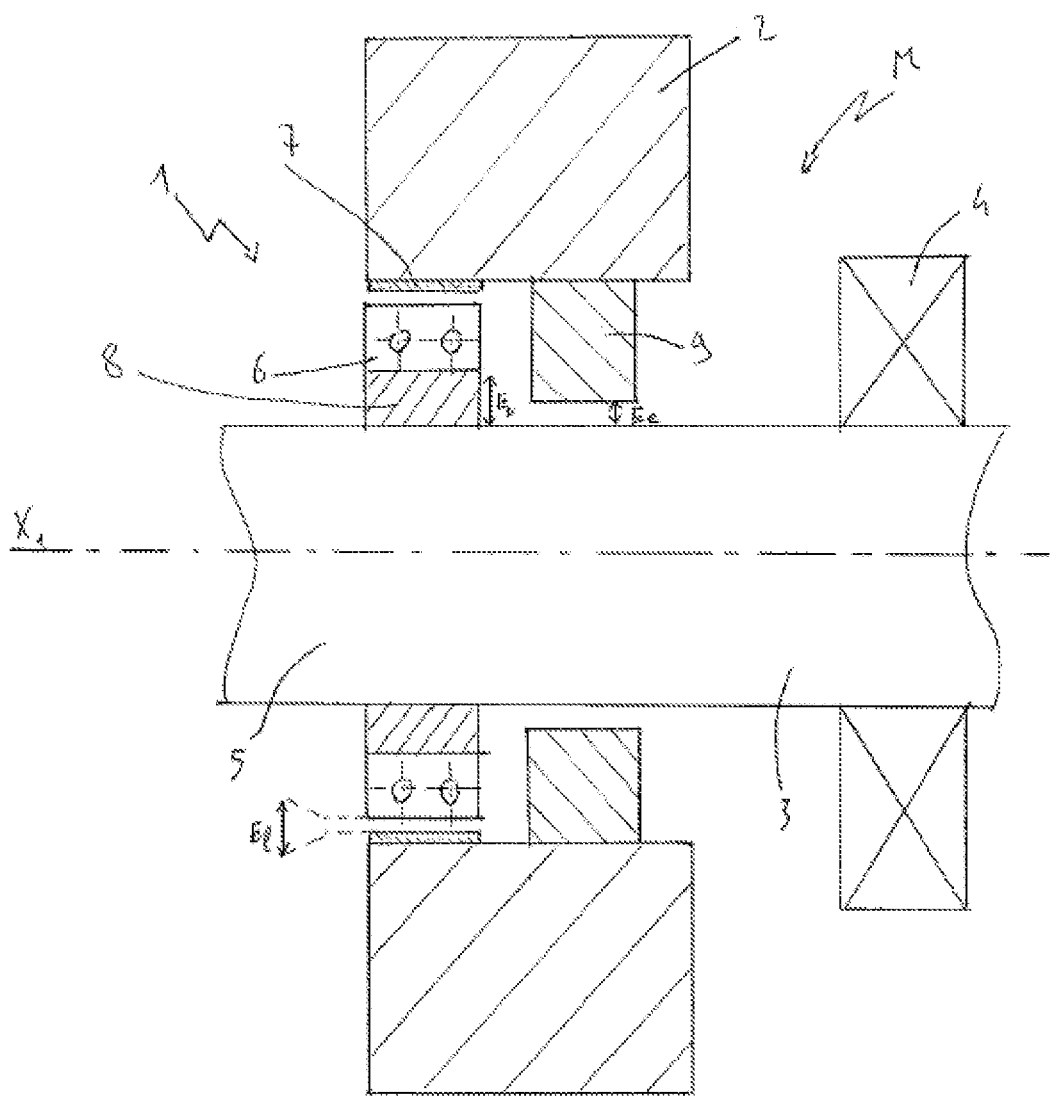
FIG. 1 is a longitudinal schematic view of a first embodiment of landing bearing assembly according to the invention and a rotary machine according to the invention comprising a stator, a rotor, a radial magnetic bearing and the landing bearing assembly.
Figure 2:
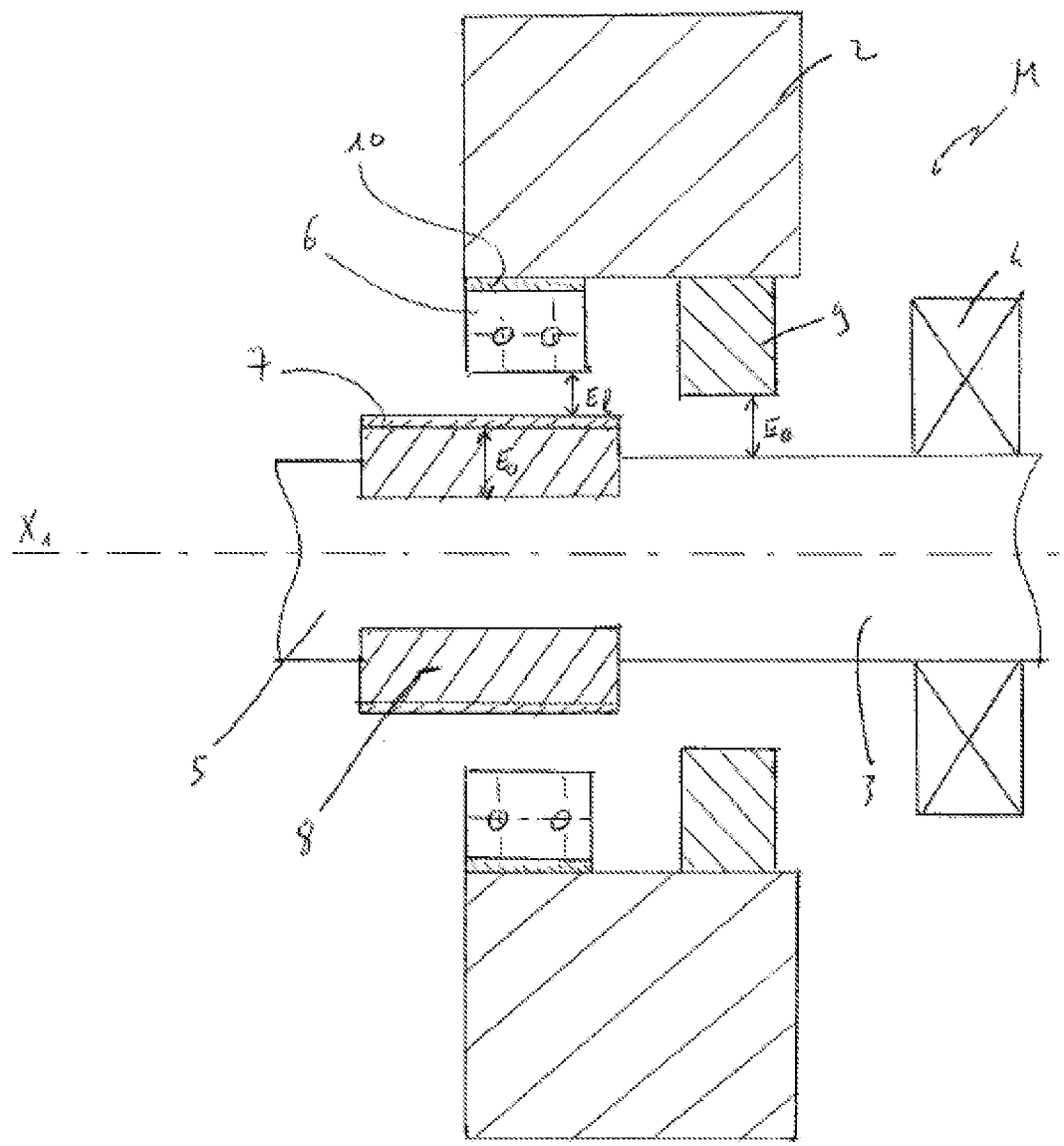
FIG. 2 is a longitudinal schematic view of a second embodiment of landing bearing assembly according to the invention and a rotary machine according to the invention comprising a stator, a rotor, a radial magnetic bearing and the landing bearing assembly.
Figure 3:
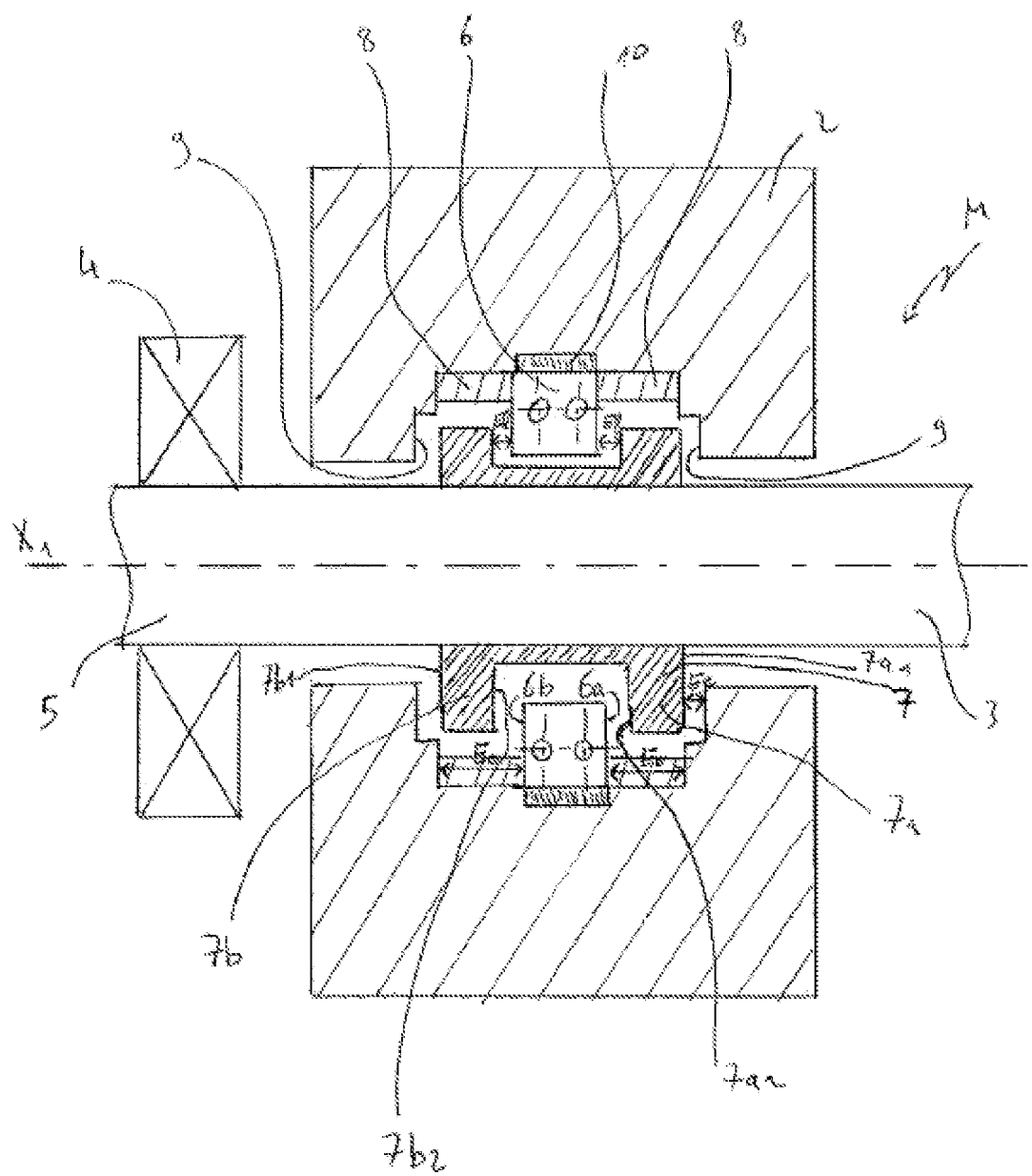
FIG. 3 is a longitudinal schematic view of the third embodiment of landing bearing assembly according to the invention and a rotary machine according to the invention comprising a stator, a rotor, an axial magnetic bearing and the landing bearing assembly.

FIGS. 1 to 3 show a rotary machine M centered on a central axis X1.

In what follows, a radial direction designates a direction perpendicular to the central axis X1, and an axial direction a direction parallel to the central axis X1.

The rotary machine M comprises a stator 2, a rotor 3, a magnetic bearing 4, and a landing bearing assembly 1.

The stator 2 is radially around the rotor 3 which is rotatable around central axis X1. The rotor 3 comprises a shaft 5.

The magnetic bearing 4 is schematically represented on the figures, its arrangement relative to the stator 2 and the rotor 3 being not shown, for simplification purpose. The magnetic bearing may consist of a radial magnetic bearing, an axial magnetic bearing, or a combination of at least one radial magnetic bearing and one axial magnetic bearing. The magnetic bearing is preferably of the active type.

The landing bearing assembly 1 supports the rotor 3 essentially during a starting or stopping operation of the rotary machine M, and also during brief intermittent periods in case of light shock-loads occurring in the event of a total or partial failure or overloading of the magnetic bearing 4.

The landing bearing assembly 1 comprises an auxiliary rolling bearing 6 and an associated landing sleeve 7.

FIGS. 1 to 3 illustrate the rotary machine M in the normal operation mode, that is to say not in the landing mode. A small airgap is maintained and controlled between the stator 2 and the rotor 3 which levitates inside the stator 2. A small airgap, let's call it landing airgap El, also exists between the auxiliary rolling bearing 6 and the landing sleeve 7. Typically, the order of magnitude of the landing airgap El is 100 microns, and is preferably comprised between 100 and 200 microns.

When the rotary machine M runs in the landing mode, the rotor 3 lands on the auxiliary rolling bearing 6. In other words, the landing airgap El decreases rapidly down to zero micron, until the auxiliary rolling bearing 6 and the landing sleeve 7 come into direct contact with each other.

In a preferred embodiment of the invention, the rolling elements of the auxiliary rolling bearing 6 are balls and there is no cage to maintain a predetermined circumferential spacing of the balls with respect to each other.

Preferably, as illustrated on the figures, the auxiliary rolling bearing 6 comprises two rows of balls.

The landing bearing assembly 1 also comprises a compliance ring 8. The compliance ring 8 is made from a metallic material such as brass or a spring steel, or an Aluminum alloy.

Another material may be used, as long as its Young modulus is smaller than that of the materials constituting the other elements which are in contact with the compliance ring 8. The compliance ring 8 may comprise some elastomeric or synthetic material or be made integrally from an elastomeric or synthetic material.

The compliance ring 8 may be made of waved metallic ribbon.

The compliance ring 8 can be in the form a solid ring.

The compliance ring 8 can be a spring washer or a stacking of spring washers.

The landing bearing assembly 1 further comprises an emergency landing ring 9 which is integrally formed with the stator 2 and which is located in the vicinity of the auxiliary rolling bearing 6.

In the preferred embodiment of the invention illustrated on FIG. 1, the compliance ring 8 has, in the radial direction, a nominal thickness Eo which is larger than the landing airgaps El. The nominal thickness Eo of the compliance ring 8 is preferably comprised between 0.2 mm and 2 mm.

Further, the compliance ring 8 seats with interference fit on a radially outer surface of the shaft 4. The compliance ring 8 has a tubular portion with an outer periphery onto which the auxiliary rolling bearing 6 seats with an interference fit.

The landing sleeve 7 is integrally formed with the stator 2 and is made from a hard material such as a hardened material like nitrated 40CAD6-12.

In normal operation of the machine M, the auxiliary rolling bearing 6 and the landing sleeve 7 are radially facing each other, with an airgap therebetween.

During the radial landing of the rotor 3, in a first step, upon landing of the auxiliary rolling bearing 6 onto the landing sleeve 7, at least a part of the energy of the shock is first absorbed by the compliance ring 8 which is compressed radially and deforms elastically. Its thickness decreases and reaches a thickness Ec. Then, in a second step, the remaining and not yet absorbed energy of the shock is absorbed by the emergency landing ring 9 so that the compliance ring 8 is not further compressed.

The emergency landing ring 9 preferably consists of a bushing integrally formed with the stator 2 and which contacts the shaft 5 of the rotor 4.

In normal operation of the rotary machine M, the emergency landing ring 9 stays at a predetermined distance from the rotor, that we call emergency airgap Ee. The emergency airgap Ee is larger than the landing airgap El, but smaller than the nominal thickness Eo of the compliance ring 8.

In other words: Eo>Ee>El.

The emergency airgap Ee is preferably comprised between 100 microns and 300 microns.

During the landing of the rotor 3, the thickness of the compliance ring 8 is reduced by Ee−El. Typically, this reduction of thickness is about 100 microns.

According to the invention, once the compliance ring 8 has been partly compressed elastically, the emergency landing ring 9 takes over and absorbs the remaining energy of the shock before the compliance ring 8 is fully compressed and loses its elasticity.

In the absence of the emergency landing ring 9, if some energy is still to be absorbed, the thickness of the compliance ring would further decrease until it reaches its a fully compressed thickness Efc corresponding to its elastic limit.

But, thanks to the emergency landing ring 9, the compliance ring 8 is never fully compressed elastically during a landing of the rotor; the compliance ring 8 keeps some elasticity.

Therefore the value of the emergency airgap Ee is predetermined by the formula:

$$Ee<El+(Eo-Efc)$$

The auxiliary rolling bearing 6 is therefore protected from too high compression forces and its physical integrity is preserved, so that is can operate again during a next landing of the rotor 3.

Thanks to the compliance ring 8 and to the fact that it is never fully compressed elastically during a landing of the rotor, the auxiliary rolling bearing 6 is never compressed between two stiff contacts, and is therefore not damaged.

The compliance ring 8 protects the auxiliary rolling bearing 6 from too high compression forces. The auxiliary rolling bearing 6 is never compressed between two stiff contacts during the landing.

In the landing mode, the compressing force acting on the auxiliary rolling bearing 6 is limited to the compressing force of the compliance ring 8 which equals to the product of the stiffness of the compliance ring 8 by the reduction of its thickness (Ee−El). If no compliance ring 8 were present, this force would be equal to the shocking force that would most likely strongly damage the auxiliary rolling bearing 6.

When the shock is over, the rotary machine M resumes its normal operation mode and runs solely on the magnetic bearing 4 again.

FIG. 2 illustrates another preferred embodiment of the invention where, for the sake of simplicity and clarity, the same elements as illustrated on FIG. 1 bear the same numeral references.

The embodiment of FIG. 2 differs from the one of FIG. 1 in that in normal operation of the rotary machine M the auxiliary rolling bearing 6 seats in the stator 2.

Further, the landing sleeve 7 seats onto an outer radial surface of the compliance ring 8. The landing sleeve 7 consists of a bushing made from hardened material such as nitrated 40CAD6-12. The landing sleeve 7 is made solidar in rotation with the compliance ring 8 by any known suitable means such as gluing, welding, brazing or interference fitting.

Optionally, a damping ribbon 10 is interposed between an outer surface of the auxiliary rolling bearing 6 and the stator 2. The damping ribbon 10 has an initial thickness comprised between 50 and 200 microns. The damping ribbon 10 is preferably in the form of a wavy ribbon. The function of the damping ribbon 10 is prevent the whirling of the shaft 5 of the rotor 3 inside the auxiliary rolling bearing 6 in normal landing mode of the rotary machine M. Typically, upon landing of the rotor 3, the thickness of the damping ribbon which is fully compressed is reduced by an amount Rr which, in a preferred embodiment, equals to 70 microns.

The value of the emergency airgap Ee is predetermined by the following formulas:

$$Ee>El+Rr \text{ and } Ee<El+Rr+(Eo-Efc)$$

FIG. 3 illustrates another preferred embodiment of the invention where, for the sake of simplicity and clarity, the same elements as illustrated on FIGS. 1 and 2 bear the same numeral references.

The embodiment of FIG. 3 relates to a landing bearing assembly 1 suitable for an axial landing of the rotor 3, that is to say in a direction substantially parallel to the axis of rotation X1. The auxiliary rolling bearing 6 is solidar in rotation with the stator 2, and a damping ribbon 10 similar to the one of the embodiment of FIG. 2 is interposed between the stator 2 and the auxiliary rolling bearing 6.

The auxiliary rolling bearing 6 has two lateral faces 6a, 6b which extend radially.

A first compliance ring 8 is interposed between one of the two lateral faces of the auxiliary rolling bearing 6 and a first radial portion of the stator 2.

A second compliance ring 8 is interposed between the other of the two lateral faces of the auxiliary rolling bearing 6 and a second radial portion of the stator 2.

Each compliance ring 8 has two lateral faces which extend perpendicularly with respect to the central axis X1.

The landing sleeve 7 seats on the shaft 5 where it is fixed by any known means such as interference fit. The landing sleeve 7 consists of a tubular portion delimitated by two lateral flanges 7a and 7b which extend radially away from axis X1. The flange 7a has two parallel faces 7a1 and 7a2 extending radially. The flange 7b has two parallel faces 7b1 and 7b2 extending radially.

In the normal operation of the rotary machine M, i.e. when the rotor 3 is supported only by the magnetic bearing 4, for each flange, one of its two faces is in axial correspondence with one of the two faces of the auxiliary rolling bearing 6, with a nominal airgap therebetween corresponding to the landing airgap El, whereas the other one of the two faces of said flange is in axial correspondence with an emergency landing ring 9 arranged on a radial surface of the stator 2, with a nominal airgap therebetween corresponding to the emergency airgap Ee.

Upon axial landing of the rotor 3, one of the two flanges of the landing sleeve 7 comes into contact with one lateral face of the auxiliary rolling bearing 6. Due to the energy of the shock, one of the compliance ring 8 is then compressed axially, and its thickness is reduced by Ee. In the embodiment of FIG. 3, the thickness of the compliance ring 8 is measured in a direction parallel to the central axis X1, in other words the thickness is in fact the width of the compliance ring 8.

The emergency airgap Ee is larger than the landing airgap El.

Still in the embodiment of FIG. 3, the landing bearing assembly 1 is able to support the landing of the rotor 3 in the two axial directions along axis X1.

In addition, technical features of the different embodiments can be, in whole or part, combined with each other. Thus, the landing bearing assembly 1 can be adapted to the specific requirements of the application.

For instance the different embodiments of the invention illustrated on the FIG. 1-3 can be combined.

Also, the compliance ring 8 which has been described so far as integrally formed with the rotor 3, may alternatively be integrally formed with the stator 2. Alternatively, the landing bearing assembly 1 may comprise a first compliance ring 8 integrally formed with the rotor 3 and a second compliance ring 8 integrally formed with the stator 2.

Also, another preferred embodiment of the invention consists of the embodiment of the FIG. 3 with the addition of a compliance ring 8 similar to the one of the embodiments of FIGS. 1 and 2, that is to say an annular ring interposed between the shaft 5 and the landing ring 7, so as to absorb also a radial landing or a combination of an axial and a radial landing.

Thanks to the invention, the auxiliary rolling bearing 6 is protected in the landing mode against a shock with too high energy, so that it can never be compressed between two hard surfaces. During a high shock, a physical contact occurs at the emergency landing ring 9, preventing other sensitive parts of the rotary machine M to be damaged. The physical integrity of the landing bearing assembly 1 is preserved so that is can operate again during a next landing of the rotor 3.

Thanks to the invention, there is also less resistance to the thermal expansion of the rings of the auxiliary rolling bearing 6 which heats up significantly during a landing. Hence, the physical integrity of the auxiliary rolling bearing 6 is further preserved during the landing operation.

The rotary machine M described in details previously can be an electric compressor or a turboexpander used for the extraction of oil or gas in the nature, or a turbo-molecular pump used for the manufacturing of electronic waffles. Alternatively, the rotary machine M may be of any kind adapted for a transportation vehicle, a machine-tool, a household apparatus, etc. For instance, the rotary machine M may be an electric compressor equipping an automotive vehicle.

NOMENCLATURE

M rotary machine
X1 axis of rotation
1 landing bearing assembly
2 stator
3 rotor
4 magnetic bearing
5 shaft
6 auxiliary rolling bearing
6a, 6b lateral face of auxiliary rolling bearing
7 landing sleeve
7a, 7b flange
7a1, 7a2, 7b1, 7b2 lateral face of flange
8 compliance ring
9 emergency landing ring
10 damping ribbon
El landing airgap
Ee emergency airgap
Eo nominal thickness of compliance ring
Ec thickness of compressed compliance ring
Efc thickness of fully compressed compliance ring
Rr reduction of thickness of the damping ribbon

What is claimed is:

1. A landing bearing assembly for a rotary machine rotatable around a central axis, comprising:
   a stator, a rotor with a shaft, and a magnetic bearing, the landing bearing assembly having an auxiliary rolling bearing with two lateral faces, a landing sleeve facing, wherein when the rotor is supported only by the magnetic bearing, the auxiliary rolling bearing at a nominal distance is defined as the landing airgap El, the auxiliary rolling bearing coming into contact with the landing sleeve upon landing of the rotor in the event of a high shock,
   a compliance ring with a nominal thickness Eo and made from a material with a lower mechanical stiffness than the material constituting the other components of the landing bearing assembly to first absorb energy of the shock by elastic deformation resulting in a reduction of its thickness, the compliance ring being in contact with the auxiliary rolling bearing at least during the landing of the rotor, and
   an emergency landing ring for absorbing the energy of the shock that cannot be absorbed by the compliance ring alone, the emergency landing ring being integrally formed with the stator and contacting the shaft of the rotor before the compliance ring has been fully compressed elastically, in such a way that the auxiliary rolling bearing is never compressed between two stiff contacts during the landing.

2. The landing bearing assembly according to claim 1, wherein the nominal thickness of the compliance ring is between 0.2 mm and 2 mm.

3. The landing bearing assembly according to any claim 1, wherein the compliance ring seats with an interference fit on a radially outer surface of the shaft.

4. The landing bearing assembly according to claim 3, wherein the auxiliary rolling bearing seats with an interference fit on an outer surface of the compliance ring.

5. The landing bearing assembly according to claim 4, wherein the landing sleeve is integrally formed with the stator,
   wherein the landing sleeve is made from a hardened material like nitrated 40CAD6-12.

6. The landing bearing assembly according to claim 1, wherein the auxiliary rolling bearing seats with an interference fit in the stator.

7. The landing bearing assembly according to claim 6, wherein the landing sleeve seats onto an outer radial surface of the compliance ring and consists of a bushing made from a hardened material like nitrated 40CAD6-12.

8. The landing bearing assembly according to claim 7, further comprising a damping ribbon, for preventing the whirling of the shaft of the rotor inside the auxiliary rolling bearing, is interposed between an outer surface of the auxiliary rolling bearing and the stator.

9. The landing bearing assembly according to claim 1, wherein the auxiliary rolling bearing is integrally formed with the stator and the compliance ring is interposed between one of the two lateral faces of the auxiliary rolling bearing and a first radial portion of the stator.

10. The landing bearing assembly according to claim 9, further comprising a second compliance ring interposed between the other one of the two lateral faces of the auxiliary rolling bearing and a second radial portion of the stator.

11. The landing bearing assembly according to claim 1, wherein, during operation of the rotary machine, the emergency landing ring stays at a predetermined distance from the rotor, defined as the emergency airgap Ee, and given by the formula: Eo>Ee>El.

12. A rotary machine comprising:
   a landing bearing assembly having a stator, a rotor with a shaft, and a magnetic bearing, the landing bearing assembly having an auxiliary rolling bearing with two lateral faces, a landing sleeve facing, wherein when the rotor is supported only by the magnetic bearing, the auxiliary rolling bearing at a nominal distance is defined as the landing airgap El, the auxiliary rolling bearing coming into contact with the landing sleeve upon landing of the rotor in the event of a high shock,
   a compliance ring with a nominal thickness Eo and made from a material with a lower mechanical stiffness than the material constituting the other components of the landing bearing assembly to first absorb energy of the shock by elastic deformation resulting in a reduction of its thickness, the compliance ring being in contact with the auxiliary rolling bearing at least during the landing of the rotor, and an emergency landing ring for absorbing the energy of the shock that cannot be absorbed by the compliance ring alone, the emergency landing ring being integrally formed with the stator and contacting the shaft of the rotor before the compliance ring has been fully compressed elastically, in such a way that the auxiliary rolling bearing is never compressed between two stiff contacts during the landing, wherein the landing bearing assembly is integral with the rotary machine.

\* \* \* \* \*